United States Patent
Lepper et al.

(10) Patent No.: US 9,083,275 B2
(45) Date of Patent: Jul. 14, 2015

(54) ELECTRONIC CIRCUIT ARRANGED TO CONTROL VOLTAGE APPLIED TO A LOAD

(75) Inventors: Joachim Lepper, Usinger (DE); Ralf Gorlach, Kronberg (DE)

(73) Assignee: Braun GmbH, Kronberg (DE)

( * ) Notice: Subject to any disclaimer, the term of this patent is extended or adjusted under 35 U.S.C. 154(b) by 269 days.

(21) Appl. No.: 13/108,449

(22) Filed: May 16, 2011

(65) Prior Publication Data

US 2011/0273153 A1    Nov. 10, 2011

Related U.S. Application Data

(63) Continuation of application No. PCT/IB2009/055044, filed on Nov. 12, 2009.

(30) Foreign Application Priority Data

Nov. 14, 2008  (EP) ..................................... 08019880

(51) Int. Cl.
| | |
|---|---|
| H02M 3/156 | (2006.01) |
| H02P 7/29 | (2006.01) |
| H02M 3/158 | (2006.01) |
| G05F 1/10 | (2006.01) |

(52) U.S. Cl.
CPC .. *H02P 7/29* (2013.01); *G05F 1/10* (2013.01); *H02M 3/156* (2013.01); *H02M 3/1588* (2013.01)

(58) Field of Classification Search
CPC ....................................................... H02P 7/29
USPC .......... 323/282, 283, 284, 285; 318/139, 293, 318/317, 504, 254, 381, 599; 363/21.08, 363/21.16, 111, 124
See application file for complete search history.

(56) References Cited

U.S. PATENT DOCUMENTS

| | | | |
|---|---|---|---|
| 3,748,564 A | 7/1973 | Ohba | |
| 4,914,376 A | 4/1990 | Meyer | |
| 6,066,834 A * | 5/2000 | Rebold | .................... 219/137.71 |
| RE37,443 E * | 11/2001 | Yaguchi | ..................... 180/205.1 |
| 2004/0085110 A1 * | 5/2004 | Gunton | ......................... 327/170 |

FOREIGN PATENT DOCUMENTS

DE        34 23 329 A1    1/1986

OTHER PUBLICATIONS

International Search Report for Z-8115Q—(PCT/IB2009/055044 dated Feb. 16, 2010.

* cited by examiner

*Primary Examiner* — Matthew Nguyen
*Assistant Examiner* — Trinh Dang
(74) *Attorney, Agent, or Firm* — Alexandra S. Anoff; Brent M. Peebles

(57) ABSTRACT

The present invention is concerned with an electronic circuit that is connectable to a voltage source and a load. The circuit comprises a controllable load switch element that is arranged so that a supply voltage provided by the voltage source in a connected state is provided to the load when the load switch element is switched on and is not provided to the load when the load switch element is switched off and a voltage detection circuitry that in the connected state is coupled to the load so as to be energized by the voltage applied to the load. The circuit further comprises a switch-on circuitry that is coupled to the load switch element and is arranged to switch on the load switch element for a determined period of time after a switch arranged between the switch-on circuitry and the voltage source is closed. The proposed circuit allows for using a simple voltage detection circuit that is energized by the voltage to be measured by providing the switch-on circuitry.

9 Claims, 5 Drawing Sheets

ELECTRONIC CIRCUIT ARRANGED TO CONTROL VOLTAGE APPLIED TO A LOAD

CROSS REFERENCE TO RELATED APPLICATION

This application is a continuation of prior co-pending International Application No. IB2009/055044, filed Nov. 12, 2009 designated the United Sates.

FIELD OF THE INVENTION

The present invention is concerned with electronic circuits that are arranged to control a voltage applied to a load and it specifically is concerned with such electronic circuits in which a supply voltage to be applied to the load is repeatedly switched-on and switched-off in a controlled manner.

BACKGROUND OF THE INVENTION

Electronic circuits according to the opening paragraph are known. Such a circuit is e.g. used to control the voltage applied to a motor as load by varying the on and off periods (i.e. the duty cycle) of a pulse-width modulation (PWM) of the voltage supply according to a control signal. An average voltage results that is lower than the supply voltage.

In U.S. Pat. No. 3,748,564 a motor control circuit is disclosed that is used to control the speed of a left and aright motor of a small vehicle, the left and the right motor driving the left and the right wheel of the small vehicle, respectively. By applying a given supply voltage in a PWM manner, the average voltage applied to the motors can be varied individually and hence the speed and the direction of the small vehicle can be influenced.

It is a disadvantage of the known control circuits that they are relatively complex and yet expensive.

It is hence desirable to provide a respective electronic circuit and a corresponding method that are relatively simple.

SUMMARY OF THE INVENTION

Such a relatively simple electronic circuit for controlling the voltage applied to a load is provided according to an embodiment of the present invention and the corresponding method is provided according to another embodiment of the present invention. Additional embodiments are also described.

An electronic circuit as proposed is connectable to a load and a voltage source. A connected state is hence the state in which the electronic circuit is connected to the load and the voltage source. The electronic circuit has an off state and an active state. The active state comprises a switch-on phase and a control phase. The electronic circuit comprises a controllable load switch element, a voltage detection circuitry, and a switch-on circuitry. The load switch element is in the connected state arranged between the voltage source and the load. When the load switch element is switched on, a supply voltage provided by the voltage supply is provided at the load and when the load switch element is switched off no voltage is provided at the load. By repeatedly switching on and off the load switch element, a pulsed voltage is provided at the load and the average voltage provided at the load is thus smaller than the supply voltage. The voltage detection circuit is coupled to the load and will be energized in the active phase by the voltage applied to the load. This allows for using a very simple and hence cheap voltage detection circuit that has no external voltage supply. In order to start the operation of the electronic circuit, the switch-on circuitry is coupled to the load switch element and is arranged to switch on the load switch element during a determined period of time after initialization of the switch-on phase, which initialization happens by closing a switch. For this period of time, the switch-on circuitry forces the load switch element to stay switched on. This allows the voltage detection circuitry to become energized and hence, after the certain period of time, the voltage detection circuitry takes over the control of the load switch element and repeatedly switches on and off the load switch element in dependence on the average voltage provided at the load. The proposed circuit switches on and off the load switch element as long as the supply voltage provided by the voltage supply is higher than the average voltage to be provided at the load. By the closed-loop control, variations in the supply voltage can be absorbed and any respective variations in the load state of the load are avoided. Specifically for the case where the supply voltage is delivered by a battery or an accumulator, an average voltage can be applied to a load so that over time the voltage provided at the load and hence the load state stays essentially constant and does not follow the usual voltage breakdown known from discharging batteries or accumulators. This leads also to the effect that the energy provided at the load is controlled to stay at a constant level, so that a prolonged battery (accumulator) lifetime results.

The electronic circuit may further comprise a switch-off circuitry that is coupled to the load switch element. The switch-off circuitry forces the load switch element to be switched-off after initialization of a switch-off phase, which initialization may happen by opening the same switch again that was closed to initialize the switch-on phase. As the closed-loop control that is performed by the voltage detection circuitry in the control phase is energized by the voltage applied to the load, just opening the switch will not stop the closed-loop control. Hence, if the switch-off phase is to be initialized by the same switch that is used to initialize the switch-on phase, the switch-off circuitry allows this by forcing the load switch element to stay switched off. Then the voltage supply of the voltage detection circuit will stop for a period long enough so that the voltage detection circuit de-energizes and the closed-loop control stops. This allows for using a single switch that needs to be operated by a user of an appliance in which the electronic circuit is used, which renders the electronic circuit and hence the appliance as simple and easy to operate.

In an embodiment of the proposed electronic circuit, the switch-on circuitry comprises a series arrangement of a first capacitor and a third resistor and further a first switch element that has a control side that is coupled in between the first capacitor and the third resistor. The first capacitor is coupled to the switch and hence starts to charge when the switch-on phase is initialized. A current is then flowing through the capacitor and into the control side of the first switch element, which first switch element becomes switched on. The first switch element is arranged between ground potential and a control side of the load switch element. While the first switch element is switched on, essentially ground potential is provided at the control side of the load switch element, which forces the load switch element to stay switched on. The current flow through the first capacitor is determined by the time constant of the series arrangement of first capacitor and third resistor. A period of time during which the load switch element is forced to be switched on by the switch-on circuitry can thus be determined.

In another embodiment of the proposed electronic circuit, the period of time is chosen such that the load is not boosting up to a load state beyond a targeted load state, which could happen as the full supply voltage provided by the voltage supply is larger than the average voltage to be applied to the load.

In a further embodiment of the proposed circuit, the switch-off circuitry comprises a second switch element that has a control side that is coupled to the switch and that is arranged between the voltage source and the control side of the load switch element. In case the switch-off phase is initiated by opening the switch, the second switch element becomes switched on and hence forces the load switch element to stay switched off.

In an embodiment of the circuit as proposed, the voltage detection circuit is arranged to measure the voltage provided at the load and to control the load switch element in such a way so that the average voltage provided at the load stays essentially at a predetermined level (the target voltage) during the control phase. Constancy of the average voltage may depend on a hysteresis and the accuracy of the voltage detection circuit. In a refinement of this embodiment, the voltage detection circuit comprises a voltage comparator element that has a voltage input at which the average voltage provided at the load is provided. The voltage comparator element compares the voltage at the voltage input with a reference voltage and provides a voltage at the voltage output in dependence on the comparison result. The voltage output is coupled to the control side of the load switch element. In an even further refinement of the previous embodiment, the voltage detection circuit comprises a low pass filter that is arranged to average the pulsed voltage provided at the load and to provide the averaged voltage at the voltage input of the voltage comparator element.

The invention is also concerned with an electric appliance in which a circuit as proposed is utilized. Such an electric appliance can be, e.g., an electric toothbrush, an oral irrigator, a pocket lamp or flashlight, an electronic tool such as a powered (cordless) screwdriver, a (cordless) handblender, a powered safety razor, or an electric dry shaver. As a load, e.g., a DC motor or a lamp can be employed. In such an electric device, the load state of the load is kept constant and the energy of a battery or an accumulator is efficiently used.

BRIEF DESCRIPTION OF THE DRAWINGS

The invention will be further elucidated by a detailed description of an exemplary circuit and by reference to figures. In the figures

DETAILED DESCRIPTION OF THE INVENTION

Figure 1:
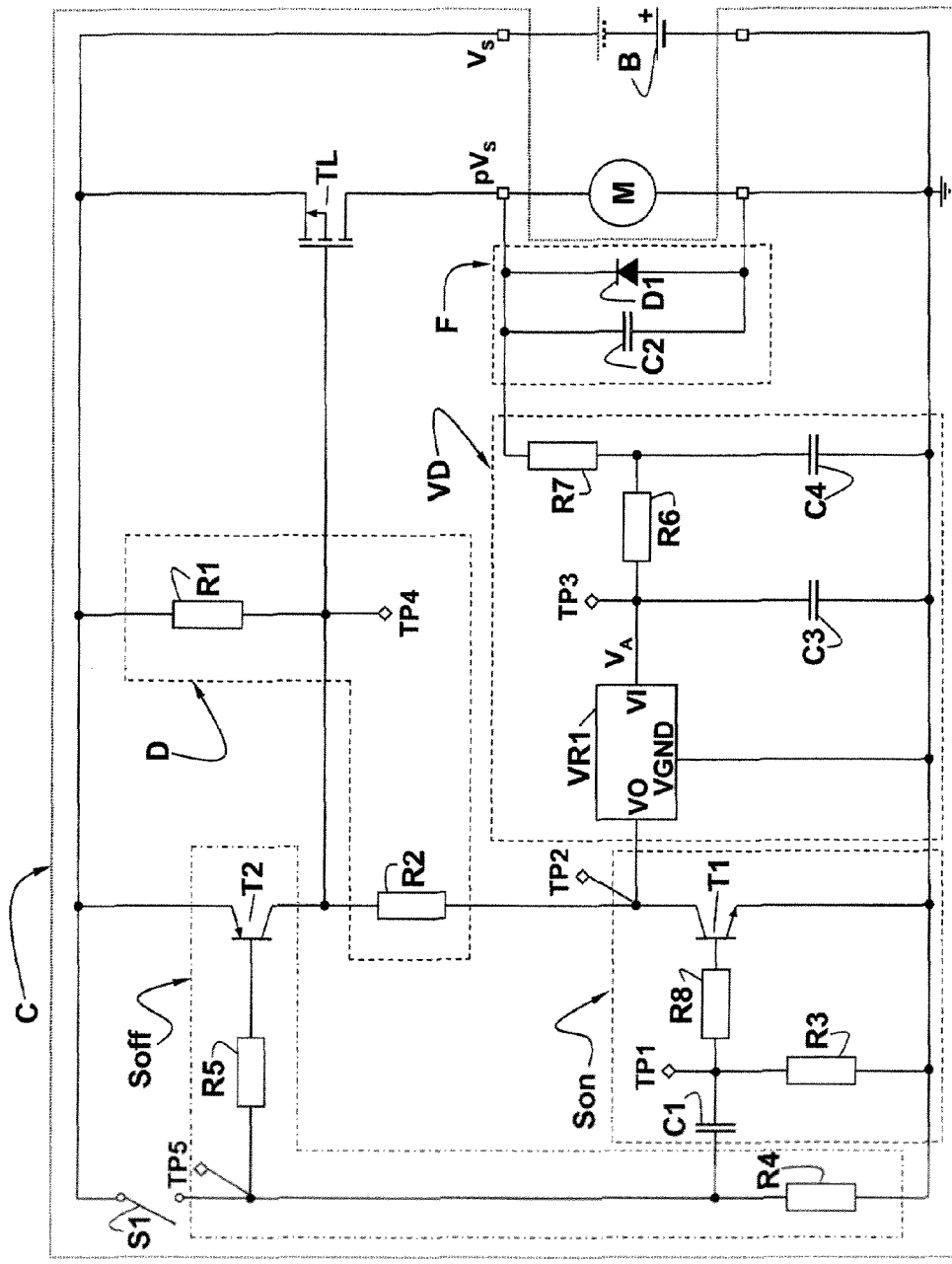
FIG. 1 is a circuit diagram of an exemplary circuit as proposed, shown in a connected state in which the circuit is connected to a load and a voltage source.

FIG. 1 is a circuitry diagram of an exemplary embodiment of an electronic circuit C as proposed. The circuit C is connectable to a load M such as a motor and a voltage source B such as a battery or an accumulator (secondary battery) or a battery and/or accumulator pack. The voltage source B may alternatively also be an AC/DC converter that is connected to mains voltage. In FIG. 1 a single battery is shown as voltage source B, but instead of a single battery, a series arrangement of batteries can be used (further batteries are indicated by a dotted battery symbol). The circuit C is shown in the connected state in which the circuit C is connected to the load M and the voltage source B.

Figure 2A:
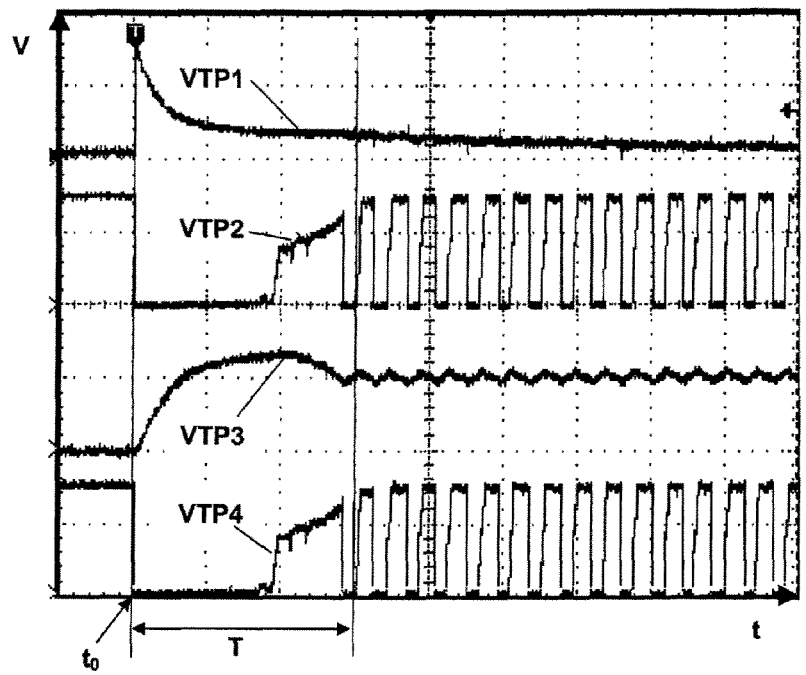
FIGS. 2A-2C are diagrams that show voltage curves measured at an exemplary embodiment of a proposed circuit for a switch-on phase for three different supply voltages.
Figure 2B:
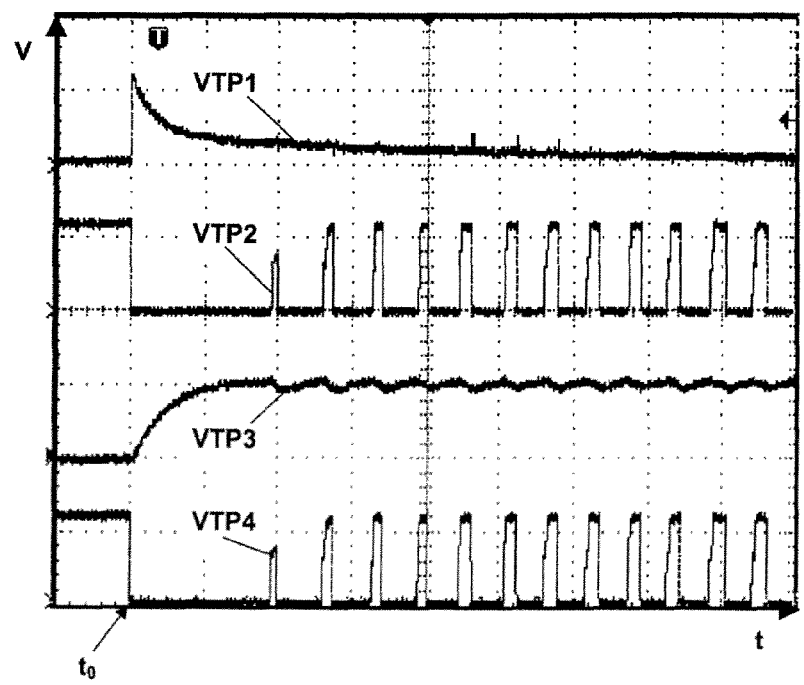
Figure 2C:
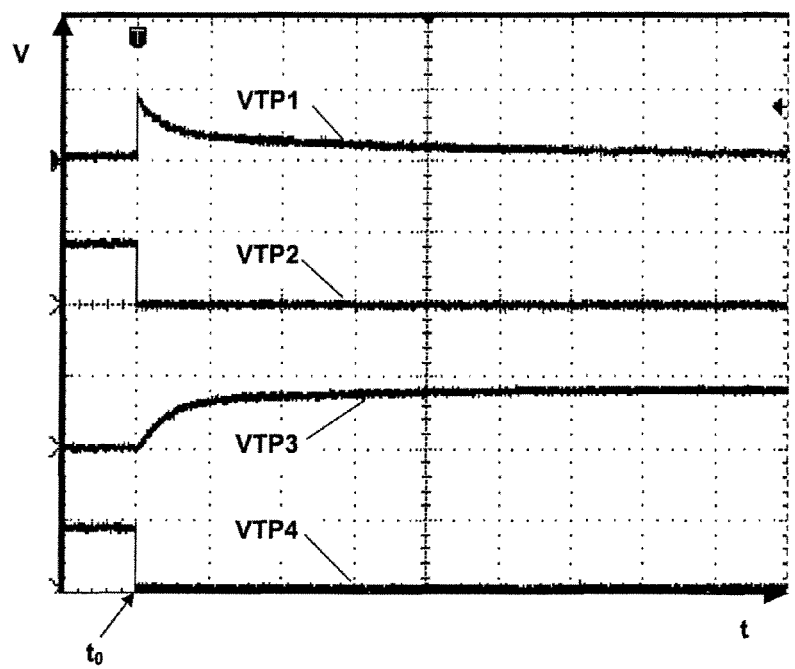

The circuit C comprises a switch S1, a voltage detection circuitry VD, a switch-on circuitry Son, a switch-off circuitry Soff, a filter circuitry F, and a load switch element TL with a respective protective circuit D. The load switch element IL is controlled in such a way that it becomes repeatedly conductive and non-conductive so that a supply voltage $V_S$ that is larger than the voltage to be applied to the load M is applied as a pulsed voltage $pV_S$ to the load M. The protective circuit D comprises a series arrangement of a first resistor R1 and a second resistor R2. The switch-on circuitry Son comprises a first switch element T1 and a series arrangement of a first capacitor C1 and a third resistor R3, which first capacitor C1 has a capacitance C and which third resistor R3 has a resistance R, so that this series arrangement has an electric time constant $\tau = R \cdot C$. The switch-on circuitry Son further comprises an eighth resistor R8 as input resistance for the control side of the first switch element. The switch-off circuitry Soff comprises a second switch element T2, a fifth resistor R5 and a fourth resistor 84. The filter circuitry F comprises a parallel arrangement of an overvoltage protection diode D1 and a second capacitor C2. The voltage detection circuitry VD comprises a voltage comparator element VR1 that is energized by the voltage to be measured and further a low pass filter comprising a sixth resistor R6, a seventh resistor R7, a third capacitor C3, and a fourth capacitor C4. The sixth resistor R6, the seventh resistor R7 and the third and fourth capacitors C3 and C4 are used to smooth (or average) the pulsed voltage $pV_S$ so that an averaged voltage $V_A$ is applied to a voltage input VI of the voltage comparator element VR1. The voltage comparator element VR1 further has a voltage output VO and a ground connection VGND. Measurement points TP1, TP2, TP3, TP4, and TP5 are also indicated in FIG. 1. Voltages measured at these measurement points TP1, TP2, TP3, TP4, and TP5 for an exemplary embodiment (Example 1 below) are shown in FIGS. 2A, 2B, and 2C and in FIGS. 3A, 3B, and 3C.

In the connected state when the voltage source B and the load M are connected to the circuit C, a series arrangement of the load switch element TL (in the shown embodiment, the load switch element TL is realized as a MOSFET) and the load M is arranged in parallel to the voltage source B such that the plus pole of the voltage source B is connected to a first side (source electrode) of the load switch element and the minus pole (ground potential) of the voltage source B is connected to a first side of the load M. A second side (drain electrode) of the load switch element TL is connected with a second side of the load M. The filter circuitry F is connected to the load M in the usual way so that the cathode of the overvoltage protection diode D1 is connected to the second side of the load M and the anode of the overvoltage protection diode D1 is connected to the first side of the load M. A first side of the second capacitor C2 is connected to the first side of the load M and the second side of the second capacitor C2 is connected to the second side of the load M. The filter circuit F is a standard filter circuit to protect a load against voltage peaks. A first side of the first resistor R1 of the protective circuit D is connected to the plus pole of the voltage source B and the second side of the first resistor R1 is connected to the control side (gate electrode) of the load switch element TL and to the first side of the second resistor R2 of the protective circuit D. A first side (emitter) of the second switch element T2 (in the shown embodiment realized as a pnp transistor) is coupled to the plus pole of the voltage source B and a second side (collector) of the second switch element T2 is connected with the first side of the second resistor R2. Further, the first side of the switch S1 (in the shown embodiment realized as a manual on/off switch) is coupled to the plus pole of the voltage source B and a second side of the switch S1 is coupled to the first side of the fifth resistor R5. The second side of the fifth resistor R5 is connected to a control side (basis) of the second switch element T2 (the fifth resistor R5 is, as is known in the art, used as basis resistor for the second switch element). The second side of the switch S1 is coupled to ground potential via the fourth resistor R4 and is further coupled to the first side of the first capacitor C1. The second side of the first capacitor C1 is coupled via the third resistor R3 to ground potential and also via the eight resistor R8 to the control side (basis) of the first switch element T1 (which is in the shown embodiment realized as a npn transistor). The eighth resistor R8 (again, used as basis resistor for the first switch element) and the first switch element T1 may be realized by a single electronic component such as a digital transistor as is e.g. provided by Rohm Co., Ltd., Kyoto, Japan. Similarly, the fifth resistor R5 and the second switch element T2 could also be realized by a digital transistor. A first side (collector) of the first switch element T1 is connected to the second side of the second resistor R2 and a second side (emitter) of the first switch element T1 is connected to ground potential. The second side of the load M is coupled to a low pass filter that comprises the sixth resistor R6, the seventh resistor R7, and the third and fourth capacitors C3 and C4. The second side of the load M is coupled to the first side of the seventh resistor R7. The second side of the seventh resistor R7 is coupled to ground potential via the fourth capacitor C4 and to the first side of the sixth resistor R6. The second side of the sixth resistor R6 is coupled to ground potential via the third capacitor C3 and to the voltage input VI of the voltage comparator element VR1. The ground connector VGND of the voltage comparator element VR1 is coupled to ground potential and the voltage output VO of the voltage comparator element VR1 is coupled to the first side (collector) of the first switch element T1 and to the second side of the second resistor R2. In a specific embodiment, the voltage comparator element VR1 is a low-voltage detection IC from the BU48XXG Series provided by Rohm Co. Ltd., Kyoto, Japan. This reset IC has no external voltage supply, compares the input voltage with an internal reference voltage, has a high accuracy of 1%, a preset hysteresis, and is very cost efficient. Obviously, the function of this reset IC can also be implemented by a discrete realization of the underlying circuit arrangement of this reset IC or by any other reset IC, specifically a more complex reset IC (or discrete realization of such), e.g. a reset IC that allows to choose between various hysteresis values and/or a reset IC that allows comparison with various voltages.

The shown circuit C is used to enable a closed loop control of the average voltage $V_A$ applied to the load M such that the average voltage is $V_A$ constant (due to a hysteresis of the voltage comparator element VR1, the constancy of the average voltage $V_A$ means a constancy within the limits given by the hysteresis value) even if the voltage $V_S$ provided by the voltage source B varies over time. To achieve this, the voltage $V_S$ provided by the voltage source B is applied to the load M in an intermittent or PWM way. The load switch element TL is controlled to switch off the voltage applied to the load M for a controlled period during a repeating cycle such that the average voltage $V_A$ stays constant. Hence, the voltage source B is chosen such that it provides a voltage $V_S$ that is higher than the average voltage $V_A$ required by the load M. In case the voltage source B provides full voltage, the off-periods are relatively long (this can be seen from FIG. 2A, which is discussed further below), while the off-periods become shorter when the voltage provided by the voltage source B drops (which can be seen from FIG. 2B). The voltage may drop in case the voltage source B is realized as a battery or an accumulator that is considerably discharged. As an example, the voltage source B may deliver 3 Volt as full voltage. If the supply voltage drops below the voltage required by the motor (which is also the reference voltage chosen for the voltage comparator element VR1 and which may be 2 Volt), no off-periods will occur (which is seen from FIG. 2C) and, in case the load M is a DC motor, the motor will rotate at a frequency proportional to the supply voltage. Such a control method as such is known, e.g. by using a microcontroller that is externally powered. The purpose of the proposed circuit C is to allow for using a voltage detection circuitry VD (and specifically a voltage comparator element VR1) that is energized by the measured (averaged) voltage while only a single switch S1 is needed to start the closed loop control and to stop the closed loop control, Further, the purpose of the circuit C is to use a very simple and cost-efficient electronic structure, to use a simple reset IC as discussed above, as voltage comparator element VR1.

Figure 3A:
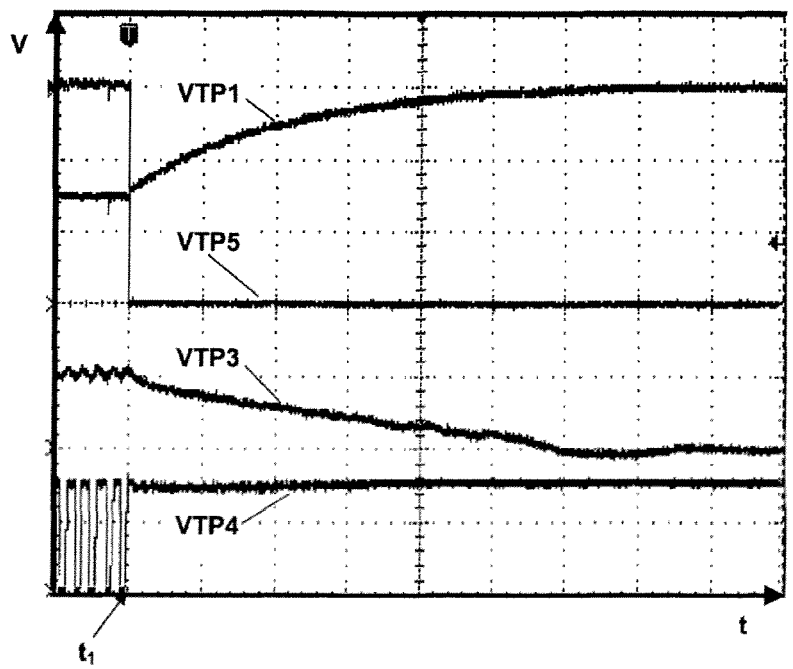
FIGS. 3A-3C are diagrams that show voltage curves measured at an exemplary embodiment of a proposed circuit for a switch-off phase for three different supply voltages.
Figure 3B:
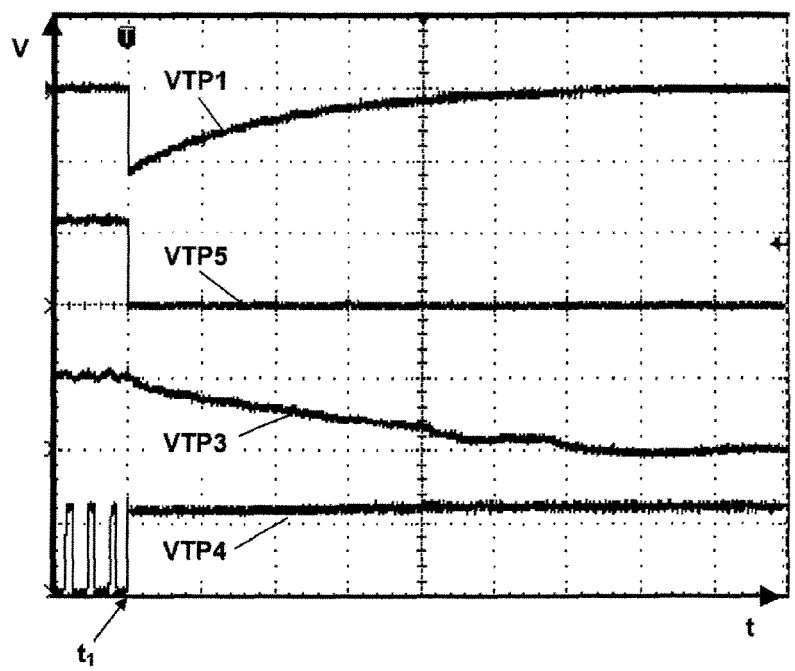
Figure 3C:
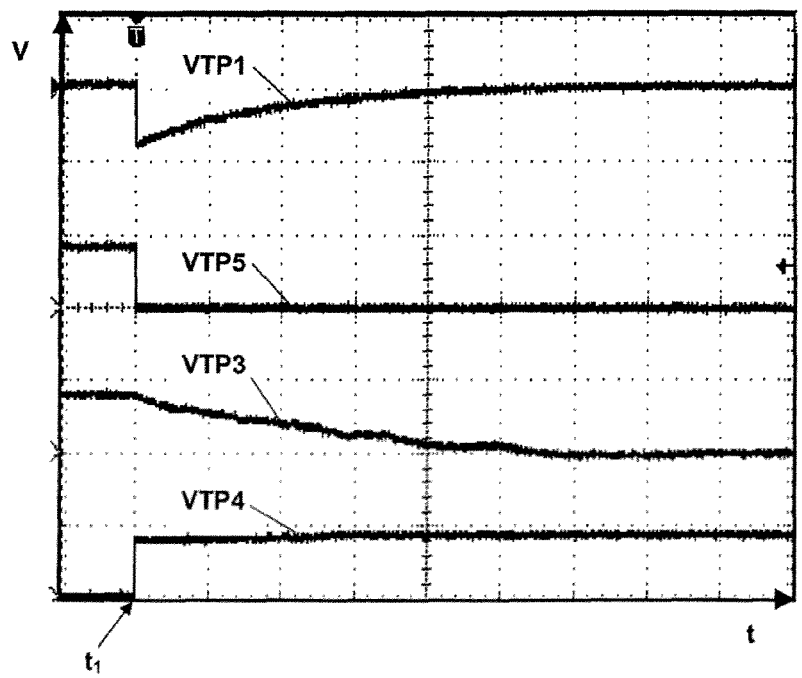

The operation of the proposed circuit C is described in the following, whereby reference is also made to FIGS. 2A, 2B, and 2C and FIGS. 3A, 3B, and 3C. In these figures voltages measured at the measurement points TP1, TP2, TP3, TP4, and TP5 indicated in FIG. 1 of an exemplary circuit realization (see Example 1 below) are shown, where voltage V is depicted against time t. Voltage curves are depicted for the switch-on (or start-up) phase (FIGS. 2A, 2B, and 2C) and for the switch-off phase (FIGS. 3A, 3B, 3C) for three different supply voltages, where to indicates the time instant at which the switch-on phase is initiated by closing the switch S1 and $t_1$ indicates the time instant at which the switch-off phase is initiated by opening the switch S1. FIGS. 2A and 3A show the voltage curves for a full voltage provided by the voltage source, FIGS. 2B and 3B show the voltage curves for a somewhat reduces mid voltage value that is still above the average voltage required by the load M, and FIGS. 2C and 3C show the voltage curves for a low voltage lying below the internal reference voltage of the voltage comparator element VR1.

In an off-state of the circuit C, the circuit C is connected to the voltage source B and the load M, while the load M is not energized (no current is flowing through the load M), and the switch S1 is open. As the voltage detection circuitry VD is energized by the measured (averaged) voltage $V_A$ applied to the load M, it would be impossible to start the closed loop control as the voltage to be measured is not present and hence the voltage detection circuitry VD is not energized. To allow using such a voltage detection circuitry VD, the proposed circuit C comprises the switch-on circuitry Son as described above. When the switch S1 is closed (at time instant $t_0$ indicated in FIGS. "a, 2B and 2C), current starts to flow through the first capacitor C1 and the third resistor R3 and current is also flowing into the control side (basis) of the first switch element T1. Due to the time constant τ=R·C that is given by the resistance R and the capacitance C of the third resistor R3 and the first capacitor C1, respectively, sufficient current flows into the control side of the first switch element T1 to make the first switch element T1 conductive for a period of time T that is determined by the time constant r. In one embodiment, the period of time T is chosen such that any boosting up of the load M beyond a targeted load state (given by the average voltage $V_A$ to be applied to the load M) is essentially avoided. A voltage VTP1 is present at measurement point TP1 that is exponentially decreasing according to the formula $VTPT1(t) = A \cdot e^{-t/\tau}$, A being a proportionality factor (top most voltage curve VTP1 in FIGS. 2A, 2B, and 2C). While the first switch element T1 is conductive, the resistance across the first switch element T1 (along the collector-emitter path) is essentially zero so that the potential on the first side (collector) of the first switch element T1 is on ground potential level. The protective circuit D, comprising the first resistor R1 and the second resistor R2, is arranged such that in this situation also the load switch element TL becomes conductive while the first switch element T1 is conductive independent on any voltage output (whether present or not present) of the voltage comparator element VR1. As a consequence, the motor is energized and the full battery voltage is provided at the motor. The averaged voltage $V_A$ (voltage curve VTP3 in FIGS. 2A-2C) is provided through the low pass filter R6, R7, C3, C4 at the voltage input VI of the voltage comparator element VR1 so that the voltage comparator element VR1 is energized. The voltage curve for the temporal behavior of VTP3 during the switch-on phase is shown in FIGS. 2A, 2B, and 2C for three different battery voltages as described above. While the first switch element T1 is conductive and hence while the load switch element TL is conductive, the voltage provided by the voltage source B is provided at the load M and the load M is energized. In an embodiment in which the load M is a motor, the motor warms up (i.e. starts to move). The time constant τ is chosen such that a secure warming up of the load M is guaranteed. In a certain embodiment, the time constant r is chosen such that the full battery voltage is applied to the motor only for a limited period of time T (e.g. 40 ms for a typical DC motor as load used in electric toothbrushes) during which the motor does essentially not speed-up to a higher rotation speed than the targeted speed at which the motor should rotate. In case the motor would speed-up to such a higher speed, this behavior would be audible. The audible speeding-up process is thus avoided by choosing the electronic components such that the switch-on period is limited (see Example 1 below). When the first capacitor C1 is charged so that the current flow through the first capacitor C1 drops to a level at which the first switch element T1 becomes non-conductive, the voltage VPT4 provided at the control side (gate) of the load switch element TL will become dependent on the voltage VPT2 provided at the voltage output of the voltage comparator element VR1 and the closed loop regulation of the average voltage $V_A$ provided at the load M starts and fast assumes a stable and continuous control phase as can be seen from the voltage curves VPT2 and VPT4 shown in FIGS. 2A, 2B, and 2C (the upper voltage level of these two voltage curves relate to the off-periods during which the load switch element TL is not conductive). Hence, the switch-on circuitry Son is relevant for the switch-on phase of the circuit C to enable the energizing of the voltage comparator element VR1 and the warming up of the load M.

When the switch S1 is closed, the second switch element T2 becomes non-conductive.

The first resistor R1 of the protective circuit D functions as a failsafe protection element (pull-up functionality) and the second resistor R2 functions as a current delimiter element.

After the start phase described above, the circuit C stays in the control phase during which the average voltage $V_A$ provided at the load M is held essentially constant. The voltage comparator element VR1 receives at its voltage input VI the voltage provided at the load M after it is averaged by the low pass filter R6, R7, C3, C4. The hysteresis of the voltage comparator element VR1 can be seen from the voltage curve VPT3 in FIGS. 2A and 2B. The voltage comparator element VR1 compares the voltage provided at its voltage input VI with a reference voltage (e.g. 2 Volts) and either provides ground potential at its voltage output VO in case the voltage provided at the voltage input VI is below the reference voltage or provides the received voltage at its voltage output if the received voltage is above the reference voltage. The voltage comparator element VR1 has a certain hysteresis, as said before. Depending on the voltage provided at the voltage output VO of voltage comparator element VR1 (shown in voltage curve VPT2 in FIGS. 2A-2C), a thereof dependent voltage (shown in voltage curve VPT4 in FIGS. 2A-2C) is applied to the control side (gate) of the load switch element TL, which—in case the supply voltage $V_S$ is above the average voltage that should be applied to the motor, as is shown in FIGS. 2A and 2B—is hence periodically switched on and off to keep the average voltage $V_A$ provided at the load M constant even in case the voltage provided by the voltage source B varies. In case the voltage provided by the voltage source B is below the targeted average motor voltage, this supply voltage will always be applied to the motor without any switching as can be seen from the voltage curves shown in FIG. 2C. During the stable control phase, the first switch element T1 and the second switch element T2 are non-conductive.

In order to allow for switching off the closed loop regulation that occurs during the control phase with the same switch S1, the switch-off circuitry Soff is provided. To initiate the switch-off phase, the switch S1 is opened (the voltage curve VPT5 shown in FIGS. 3A, 3B, and 3C indicates this switching at time instant $t_1$). As a result, the second switch element T2 becomes conductive, which in turn forces the load switch element TL to become non-conductive independent on the output of the voltage comparator element VR1 (without the switch-off circuitry Soff, the closed loop control would simply continue if the switch S1 is opened). As a consequence, the load M remains without voltage supply. In case the load M is a motor, the motor slows down and finally stops. Voltage curve VPT3 shown in FIGS. 3A, 3B, and 3C shows the averaged voltage that is generated by the motor of Example 1 during it slows down. As external current flow through the circuit C stops, the fully charged first capacitor C1 discharges over the fourth resistor R4 of the switch-off circuitry Soff, as can be seen from the respective voltage curves VTP1 shown in FIGS. 3A, 3B, and 3C. Further, the voltage supply of the voltage comparator element VR1 stops when neither a voltage is applied at the load M nor a voltage is generated by the load M (e.g. a motor would generate an inductive voltage due to its ongoing movement which is a result of the rotor inertia—see voltage curves VTP3 shown in FIGS. 3A, 3B, and 3C). Voltage curves VPT4 in FIGS. 3A, 3B, and 3C show that the voltage comparator element VR1 stops switching the output voltage as the voltage provided at its voltage input VI (shown in voltage curves VPT3) drops below the reference voltage. The voltage shown by voltage curve VPT4 is measured at measurement point TP4 and is hence put on high voltage when the second switch element T2 becomes conductive. Hence, after a short period of time T, the switch-off phase is completed and no voltage is present at the load M or applied to the voltage comparator element VR1. The circuit C is then again in the off-state.

The circuit can be switched-on as was described above.

In another embodiment, the voltage comparator element VR1 comprises a selector with which a reference voltage of the voltage comparator element VR1 can be selected, so that it is enabled to use the proposed circuit also to provide one of several constant voltages to a load. In case the proposed electronic circuit is used in a pocket lamp, different light intensities can then be selected. In case of a motor as load, different motor speeds can be selected. If the circuit is e.g.

utilized in an oral irrigator, different water pressures can then be selected. In case of a driven toothbrush, different brushing speeds can be selected.

EXAMPLE 1

In an exemplary embodiment of the proposed circuit C, the circuit C is electronically dimensioned to operate with a typical DC motor as is used for electric toothbrushes as load M. The average voltage $V_A$ that should be applied to this motor is 2 Volt. As voltage source B, a series arrangement of two standard AA batteries (or accumulators), each providing 1.5 Volt, is used, so that a full voltage provided by this series arrangement is 3 Volt. As voltage comparator element VR1 a low voltage detector IC BU4820G from the BU48XXG Series as provided by Rohm Co., Ltd., Kyoto, Japan, was utilized. This low voltage detector IC compares input voltages with an internal reference voltage of 2 Volt and has an accuracy of ±1%. As switch load element TL a MOSFET IRLML6401 as provided by International Rectifier, El Segundo, Calif. USA, was used. As first and second switching elements T1 and T2, universal pnp and npn transistors such as BC848B and 8C858C, respectively, can be used. The first and the third resistors R1 and R3 had a resistance of 100 kilo-Ohm, the second and fourth resistors R2 and R4 had a resistance of 1 kilo-Ohm, while the resistances of the fifth, sixth, seventh and eighth resistor R5, R6, R7, and R8 were 200 kilo-Ohm, 511 Ohm, 221 Ohm and 10 kilo-Ohm, respectively. As first diode D1, a LL4148 diode was used. The first capacitor C1 had a capacitance of 0.47 micro-Farad, the second capacitor C2 had a capacitance of 0.15 micro-Farad, and the third and fourth capacitors C3 and C4 had each a capacitance of 4.7 micro-Farad. The voltage curves as shown in FIGS. 2A, 2B, and 2C and FIGS. 3A, 3B, and 3C were measured at a circuit according to Example 1 at measurement points TP1, TP2, TP3, TP4, and TP5 as indicated in FIG. 1. Voltage curves in FIGS. 2A and 3A were measured with a supply voltage of 3 Volt, voltage curves in FIGS. 2B and 3B were measured with a supply voltage of 2.4 Volt, and voltage curves in FIGS. 2C and 3C were measured with a supply voltage of 1.7 Volt. The switch-on time period T (as indicated in FIG. 2A) was 40 ms, which was short enough to inhibit any audible speed-up of the motor to a speed above the desired speed that is given by the targeted average voltage $V_A$ to be applied in the control phase.

Instead of a MOSFET as load switch element TL, the load switch element TL could also be realized as a bipolar transistor, typically within a Darlington arrangement, and with respective modifications to the exemplary embodiment shown in FIG. 1.

Figure 4:
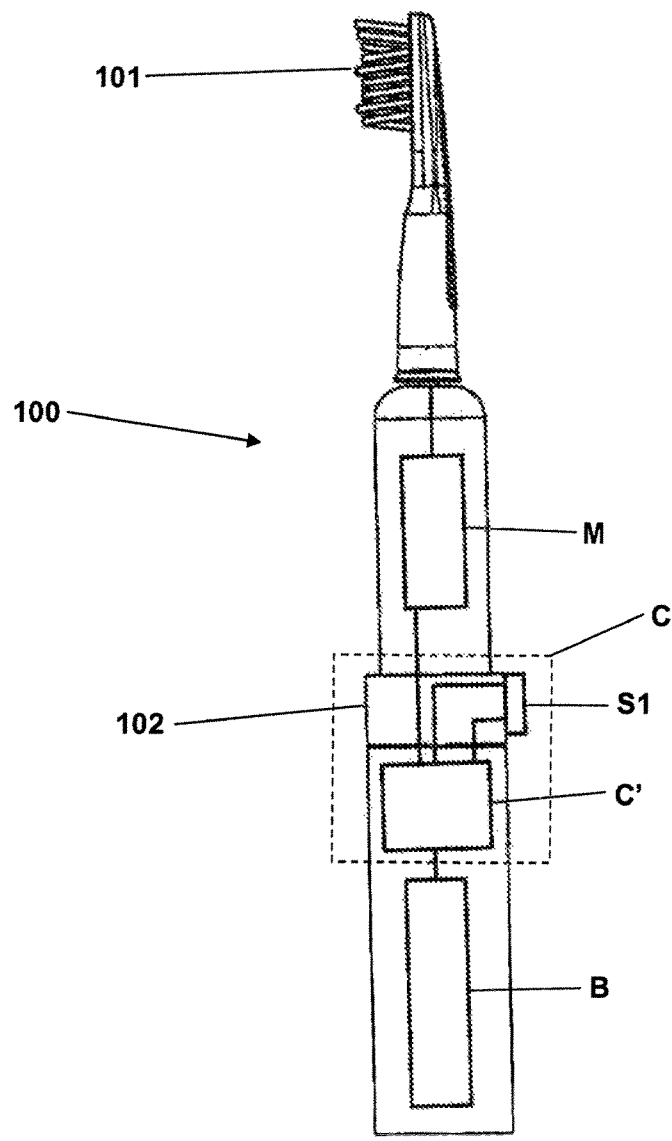
FIG. 4 is a schematic depiction of an electric appliance in which the proposed circuit is employed.

FIG. 4 shows an exemplary embodiment of an electric appliance in which the proposed circuit is utilized. The exemplary electric appliance is an electric toothbrush 100 that has a toothbrush head 101 and a handle 102. In a cavity of the handle 102, a voltage source B is located as well as a circuit C' and a load M. A switch S1 is arranged on the outside of the body of the handle 102. The circuit C' and the switch S1 form a circuit C as proposed. The load M is a DC motor that is used to drive the toothbrush head 101 so that the head section can be used to clean teeth as is known in the art of electric toothbrushes. The voltage source B can be realized by a standard (primary or secondary) battery or by several batteries. e.g. by a series arrangement of two standard rechargeable AA batteries. The circuit C is coupled to the motor and to the battery. By closing and opening the single switch S1, the switch-on and switch-off phases of the regulation of the voltage applied to the load M is initiated, respectively, as has been described.

Even though the proposed electronic circuit was discussed with reference to a motor as load and specifically with reference to an electric toothbrush as electronic device in which the electronic circuit is used, the invention is not limited to such embodiments. Electronic devices in which the proposed electronic circuit can be utilized comprise oral irrigators, (cordless) electronic tools such as electronic screwdrivers, (cordless) kitchen devices such as handblenders, pocket lamps or flashlights, powered safety razors, and electric dry shavers.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

The invention claimed is:

1. An electronic circuit connectable to a voltage source and a load, said electronic circuit comprising:
   a controllable load switch element that is arranged so that a supply voltage provided by the voltage source in a connected state is provided to the load when the load switch element is switched on and is not provided to the load when the load switch element is switched off; thus applying a pulsed voltage at the load; and
   a voltage detection circuitry that is coupled to the load and is arranged for controlling the load switch element in dependence on an average voltage derived by averaging the pulsed voltage applied at the load in a closed-loop manner; wherein the voltage detection circuit is arranged to be energized by the pulsed voltage applied at the load; and
   a switch-on circuitry coupled to the load switch element and arranged to switch on the load switch element for a determined period of time after a switch arranged between the switch-on circuitry and the voltage source is closed and wherein the switch-on circuitry comprises a series arrangement of a first capacitor and a third resistor and further a first switch element that has a control side that is coupled in between the first capacitor and the third resistor, and the first switch element is arranged between ground potential and a control side of the load switch element; and
   further comprising a switch-off circuitry that is coupled to the load switch element and is arranged to switch off the load switch element after the switch is opened.

2. The electronic circuit according to claim 1, wherein a period of time is chosen such that any boosting up of the load during a period of time beyond a targeted load state is avoided.

3. The electronic circuit according to claim 1, wherein the switch-off circuitry comprises a second switch element that has a control side that is coupled to the switch and that is arranged between the voltage source and a control side of the load switch element.

4. The electronic circuit according to claim 1, wherein the voltage detection circuitry is arranged for measuring the supply voltage provided at the load and for switching on or switching off the load switch element such that an averaged voltage over the load stays at a predetermined level in a control phase.

5. The electronic appliance comprising the electronic circuit according to claim 1 and the load that is connected to or connectable with the electronic circuit.

6. The electronic circuit according to claim 4, wherein the voltage detection circuitry comprises a voltage comparator element that is arranged to compare the average voltage provided at a voltage input with a reference voltage and to provide a voltage at a voltage output in dependence on the comparison result.

7. The electronic device according to claim 5 that further comprises a voltage source that is connected to or connectable with the electronic circuit.

8. The electronic circuit according to claim 6, wherein the voltage detection circuitry comprises a low pass filter that is arranged to average the supply voltage applied to the load and to provide the averaged voltage at the supply a voltage input of a voltage comparator element.

9. An electronic circuit connectable to a voltage source and a load, said electronic circuit comprising:
- a load switch element that is arranged so that a battery provided by the voltage source in a connected state is provided to the load when the load switch element is switched on and is not provided to the load when the load switch element is switched off; thus applying a pulsed voltage at the load; and
- a voltage detection circuitry that is coupled to the load and is arranged for controlling the load switch element in dependence on the average voltage derived by averaging the pulsed voltage applied at the load in a closed-loop manner; wherein the voltage detection circuit is arranged to be energized by the pulsed voltage applied at the load; and
- a switch-on circuitry coupled to the load switch element and arranged to switch on the load switch element for a determined period of time after a switch arranged between the switch-on circuitry and the voltage source is closed and wherein the switch-on circuitry comprises a series arrangement of a capacitor and a resister and wherein the switch-on circuitry comprises a series arrangement of a first capacitor and a third resistor and further a first switch element that has a control side that is coupled in between the first capacitor and the third resistor, and the first switch element is arranged between ground potential and a control side of the load switch element; and
- further comprising a switch-off circuitry that is coupled to the load switch element and is arranged to switch off the load switch element after the switch is opened and wherein the switch-off circuitry comprises a second switch element that has a control side that is coupled to the switch and that is arranged between the voltage source and a control side of the load switch element.

* * * * *